United States Patent [19]

Clifford-Jones

[11] Patent Number: 4,585,192
[45] Date of Patent: Apr. 29, 1986

[54] LEADING EDGE ARRANGEMENTS FOR AIRCRAFT WINGS

[75] Inventor: John B. Clifford-Jones, Hatfield, England

[73] Assignee: British Aerospace Public Limited Company, London, England

[21] Appl. No.: 595,358

[22] Filed: Mar. 30, 1984

[30] Foreign Application Priority Data

Mar. 30, 1983 [GB] United Kingdom ................ 8308821

[51] Int. Cl.⁴ .............................................. B64C 3/50
[52] U.S. Cl. .................................... 244/214; 244/210
[58] Field of Search ................ 244/210, 214, 215, 216

[56] References Cited

U.S. PATENT DOCUMENTS

| 2,688,455 | 9/1954 | Clark | 244/216 |
| 2,938,680 | 5/1960 | Greene et al. | 244/214 |
| 3,244,384 | 4/1966 | Bracka et al. | 244/210 |

FOREIGN PATENT DOCUMENTS

| 45988 | 2/1982 | European Pat. Off. | 244/214 |
| 1481578 | 1/1970 | Fed. Rep. of Germany | 244/214 |
| 1003096 | 3/1952 | France | 244/214 |
| 58868 | 4/1954 | France | 244/214 |
| 1275058 | 9/1961 | France | 244/216 |
| 115156 | 10/1945 | Sweden | 244/216 |

Primary Examiner—Galen L. Barefoot
Attorney, Agent, or Firm—Cushman, Darby & Cushman

[57] ABSTRACT

A leading edge arrangement includes a fixed wing portion 10, a slat member 18 slidably mounted with respect thereto by an arm 14. The arm 14 is provided with an internal trackway 15 and external cam surfaces 16' and 16", the trackway co-operating with roller bearings 12 on the fixed wing portion and the cam surfaces co-operating with respective roller bearings 13' and 13" on the fixed wing portion. The profiles of the trackway and cam surface are selected so that from a stowed cruise condition the slat member initially moves to a take-off setting along a path in which the ratio of downward deflection to extension movement is low, and subsequently moves to a landing setting along a path in which the said ratio is high. A modification is also described in which the rearward heel of the slat member which is exposed when the slat is extended is formed of a flexible panel portion, so that it may blend smoothly with the remainder of the rearward surface of the slat member.

8 Claims, 6 Drawing Figures

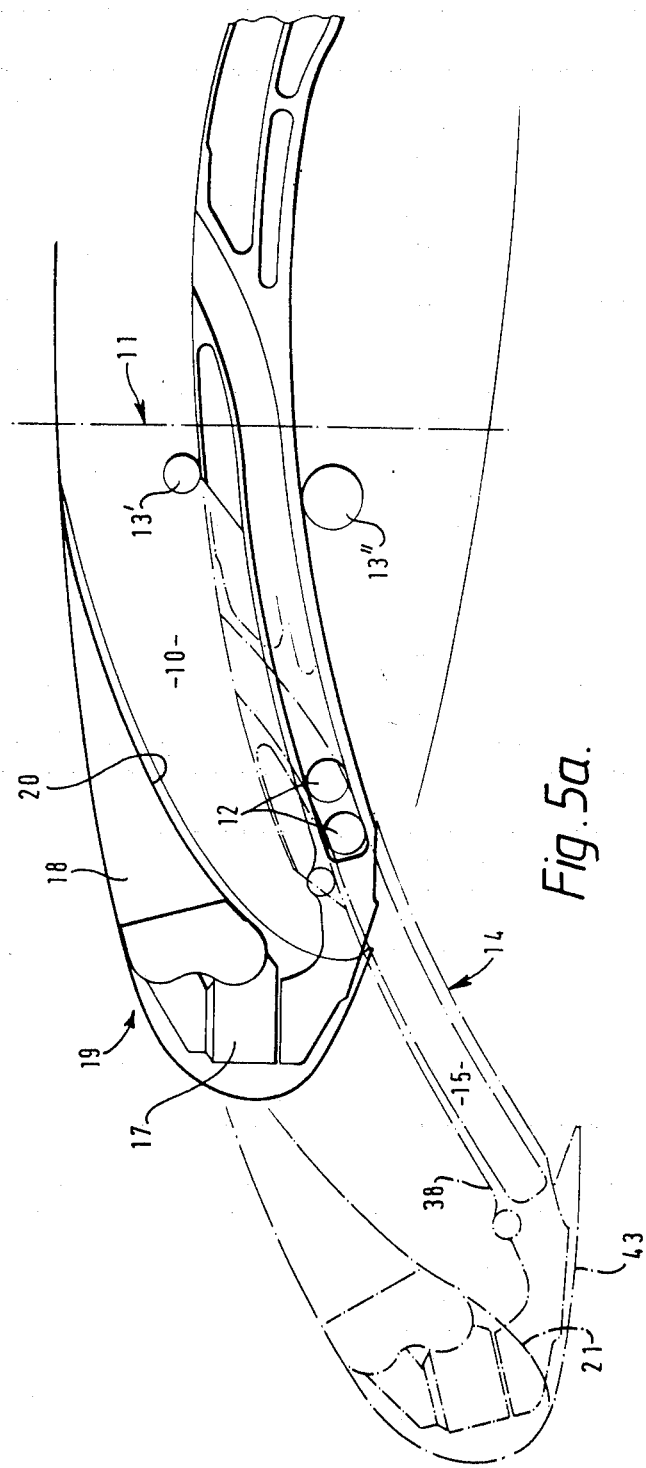

LEADING EDGE ARRANGEMENTS FOR AIRCRAFT WINGS

This invention relates to leading edge arrangements in which a slat is provided forwardly of a fixed wing portion and is movable between a cruise configuration in which it lies adjacent the wing and a high-lift configuration in which it is spaced from the wing to define a slot.

In normal operation of an aircraft, the demand for the maximum attainable lift co-efficient occurs in the landing phase, and thus the performance of the slat becomes more critical when rotated at its full extension. In conventional circular arc forms of arrangement, the path followed by the slat is by definition a circular arc, and thus if the slat separation and deflection with respect to the wing is optimised for the landing phase, a limited locus of points exist for the take-off slat setting, and consequently this setting is a compromise.

In another respect, conventional leading edge devices comprise a slat having a trailing edge region of concave form matching the convex form of the leading edge of the wing. When this form of slat is extended, there is a sharp cusp-like heel line at the lower rear portion of the slat and this is far from the ideal aerodynamic shape since flow separation occurs at this heel line.

According to one aspect of this invention, there is provided a leading edge arrangement for a wing which arrangement includes a fixed wing portion, a slat member, arm means secured to the slat member and being slidably mounted with respect to said fixed wing portion to allow movement of the slat with respect to the fixed wing portion, first and second cam surface means associated with first and second cam surface follower means respectively provided to control movement of the slat member between a stowed position and an extended position and configured so that from its stowed position the slat member initially moves to a take-off position, along a path in which the ratio of downward deflection of the slat member to its forward extension is relatively low, thereby to increase the effective chord of the wing, and thereafter moves to a landing position along a path in which the ratio of downward deflection of the slat member to its forward deflection is relatively high, thereby to increase the camber of the wing. By this arrangement, the path followed by the slat member is not constrained to be circular, and thus an optimised path can be achieved having regard to aerodynamic consideration such an extension, slot size, separation etc. for the landing setting, the take-off setting and intermediate settings.

Preferably, said first and second cam surface means are provided on said arm means. In this arrangement, the first cam surface means preferably comprises a trackway formed in a forward region of said arm means and the second cam surface means preferably comprises an external cam surface provided on a rearward region of said arm means. By this arrangement, the respective cam tracks can overlap without interference and thus the length of the arm means may be reduced. Preferably, each of said first and second cam surface means include forward and rearward portions, the respective forward portions each being of circular arc form centred on a common given point located a substantial distance below the fixed wing portion. This causes the slat member initially to follow a circular path of gentle curvature when moved from its stowed position.

Conveniently, the rearward portion of said first cam surface means is of arcuate form having a relatively high curvature in the sense opposed to that of the forward portion. This assists in causing the final portion of the path followed by the slat member steeply to curve downwards.

Advantageously, a flexible panel portion is attached to a lower region of said slat member, the panel portion being movable between an unfolded position in which it defines a generally smooth intermediate portion bridging the fixed wing portion and the slat member when the slat member is in its stowed position, and a folded position in which it defines a generally smooth rearward surface for said slat member when the slat member is in an extended position.

In another aspect of this invention, there is provided a leading edge arrangement for an aircraft wing, including a fixed wing portion, a slat member arranged forwardly thereof, and a panel portion attached to or forming part of a lower region of the slat member, the slat member being movable from a stowed, cruise configuration, in which it lies generally adjacent the fixed wing portion and an extended, high lift configuration, in which a slot is defined between the slat member and the fixed wing portion, the panel portion being movable between an unfolded position in which it defines a generally smooth intermediate lower surface bridging the fixed wing portion and the slat member when the slat member is in its stowed configuration, and a folded position in which, together with further surface regions of the slat portion, it defines a generally smooth forward wall region for said slot when the slat member is in an extended configuration.

This arrangement allows the aerofoil shape of the slat member when extended to be improved as compared to conventional designs by eliminating the heel and thereby reducing the thickness of the slat member when it is extended.

The panel portion is preferably in the form of a flexible panel attached to the slat member. The panel may be formed of a flexible metal or a fibre reinforced plastics material.

The panel portion is preferably moved between its unfolded and folded positions by spring strut means connected between the panel portion and the slat member. The movement is preferably controlled by a cam/cam track arrangement. In one embodiment, the slat member is carried by arm means mounted in the fixed wing portion for sliding movement with respect thereto. In this instance, the cam/cam track arrangement for controlling movement of the panel portion preferably includes link means extending between the panel portion and a forward portion of the arm means and cam means associated therewith which co-operate with cam surface means provided in the fixed wing portion to effect folding and unfolding of the panel portion under the influence of the spring strut means.

In this specification, terms such as upper, lower, forward and rearward refer to an aircraft when in straight and level flight.

Further aspects will become apparent from the following description, which is given by way of example only, reference being made to the accompanying drawings, in which FIG. 1 is a sectional side view, with certain parts removed for clarity of an aircraft wing having a leading edge device of this invention, with the slat in its stowed configuration;

FIGS. 5a and 5b are schematic views corresponding to FIG. 3 and illustrating the disposition of the arm means when the slat is at its take-off setting and landing setting respectively.

Figure 1:
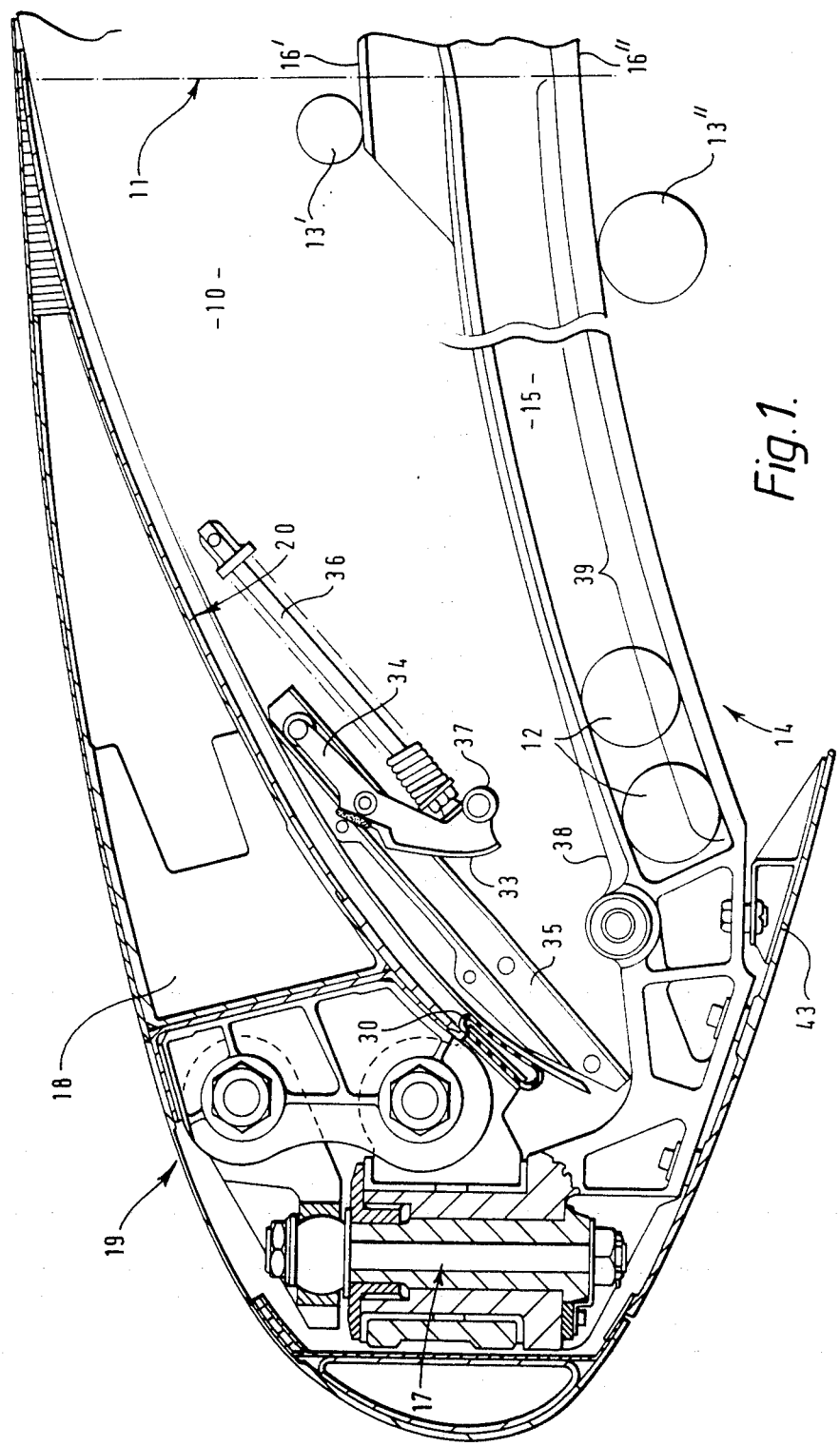

The leading edge device represented in the Figures is intended to achieve two aims, namely to provide an arrangement in which the movement of the slat may be programmed so as to provide optimum positions for the slat at both take-off and landing settings, and also to provide a modified profile for the slat when extended thereby to reduce the drag associated with the cusp-like heel of the slat.

Referring to the Figures, there is illustrated a fixed wing portion 10 having a front spar indicated generally at 11 and a leading edge region of generally convex form extending forwardly thereof. Within the area bounded by the leading edge region and the front spar is provided two sets of roller bearings 12 and 13 respectively, the former set being rotatably mounted on a bogey member itself rotatably mounted on the wing structure, and the latter set comprising two spaced rollers 13' and 13". A slat cam track 14 is supported and guided by the sets of roller bearings with roller bearings 12 running in a trackway 15 formed therein and rollers 13' and 13" bearing on opposed external cam surfaces 16' and 16". The form and shape of the arm-means and its trackway and cam surfaces will be described in greater detail below, but for the present it is sufficient merely to note that the slat cam track 14 supports at one end, via an adjustable knuckle assembly 17 a spanwise extending slat member 18 and guides it for movement along a predetermined path between the stowed configuration and fully extended configuration shown in FIG. 3, or alternative paths as may be required.

Figure 2:
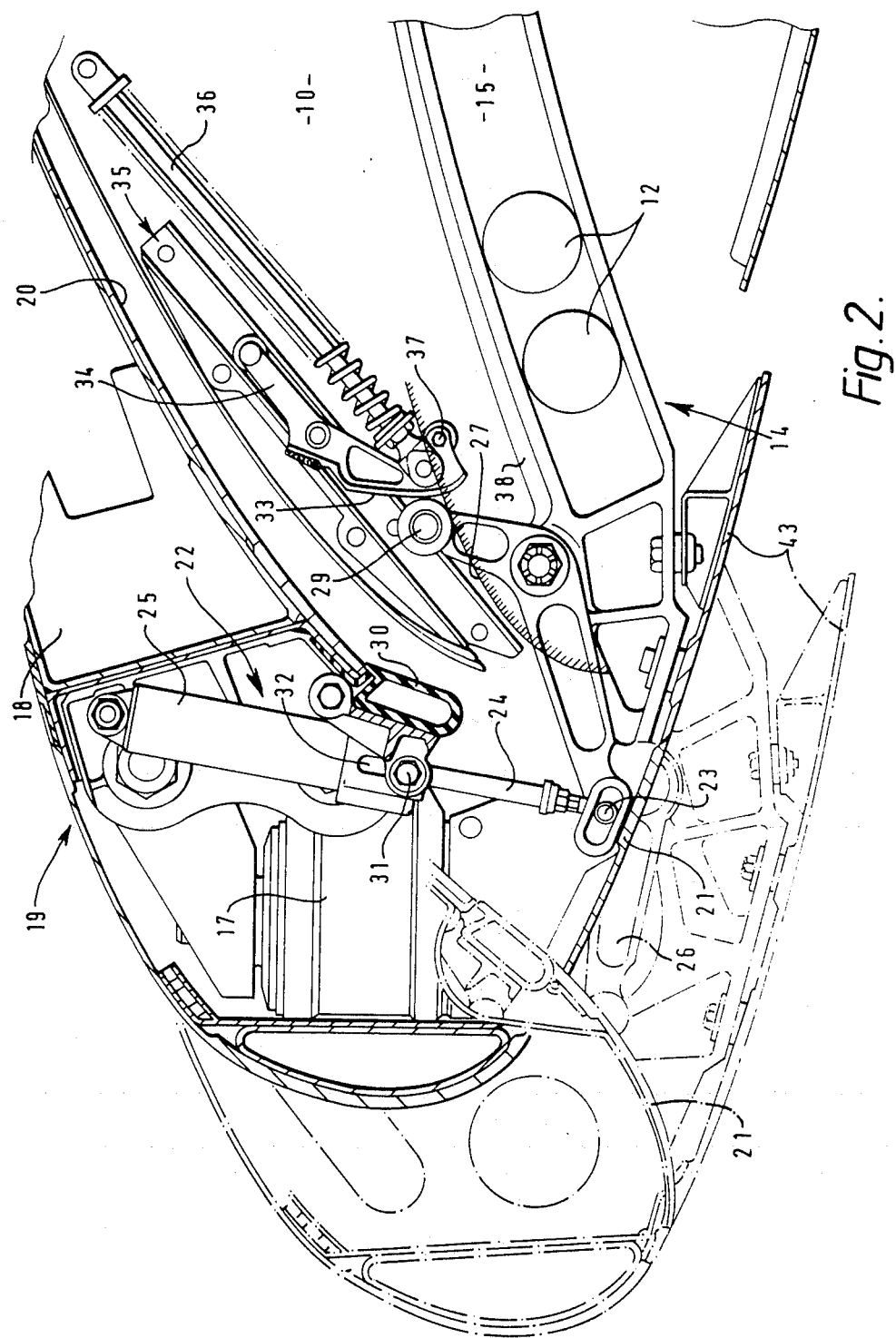
FIG. 2 is a sectional side view of the wing of FIG. 1 but with the slat in first and second intermediate extended configurations, showing steps in the movement of the panel portion from its unfolded to its folded position.
Figure 4:
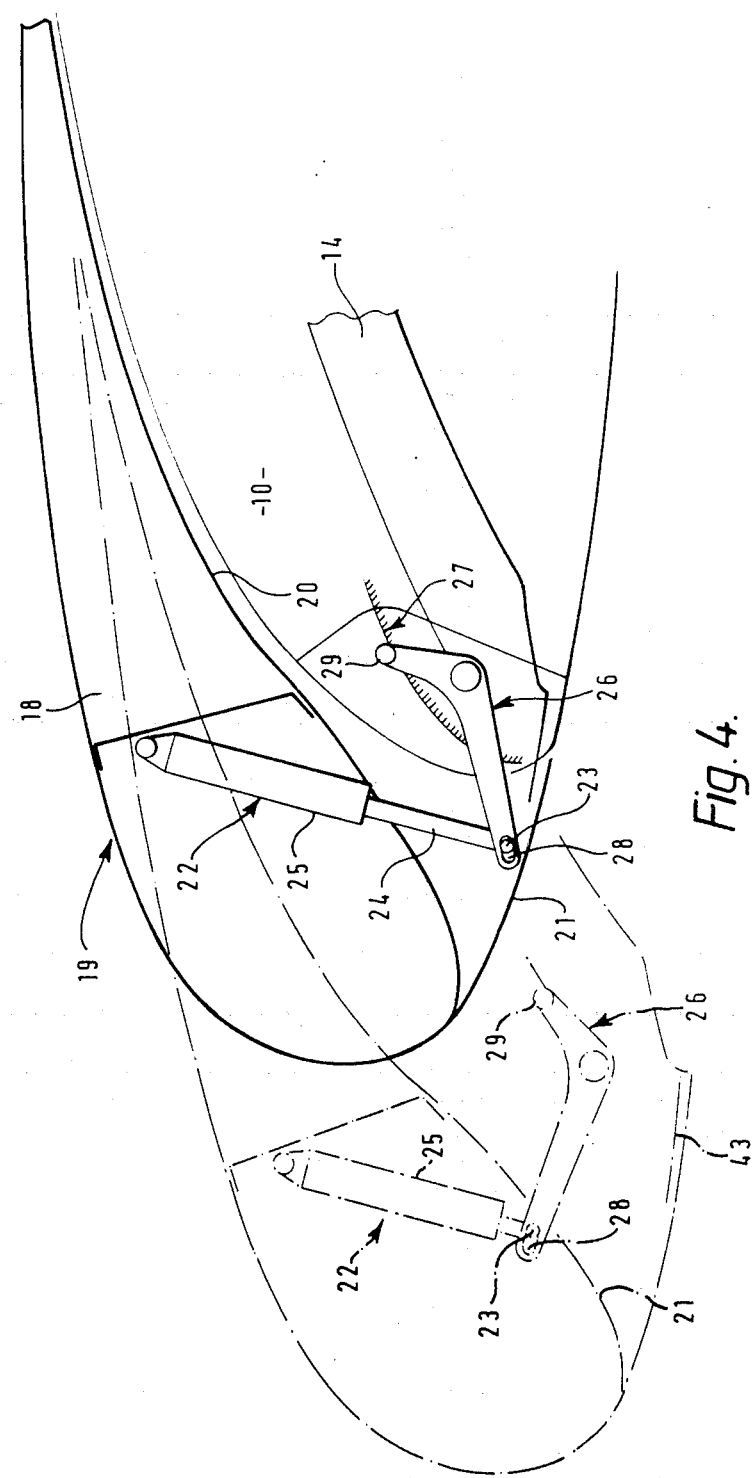
FIG. 4 is a schematic view corresponding to FIG. 2 and illustrating the manner in which the panel portion is moved between its folded and unfolded positions.

The slat member 18 includes a leading surface region 19 of convex form and a trailing surface region 20 of concaveform, the trailing surface region being configured to match a major portion of the leading edge region of the fixed wing portion 10. To either side of the knuckle assembly 17 the slat member 18 includes flexible panel portions 21, formed for example of flexible metal material or a fibre reinforced material, which extend spanwise and which are secured at their forward edge regions to the lower trailing edge of leading surface region 19. When the wing is in its cruise configuration, the panel portion extends rearwardly, as shown in FIG. 1, to define a substantially smooth and continuous lower leading surface region intermediate the slat member and the fixed wing portion. Referring now in particular to FIGS. 2 and 4, one end of a tension spring strut assembly 22 is pivotally coupled to the inside surface of a trailing region of the panel portion 21 by means of a spanwise rod 23 on which are journalled both the end of the spring strut assembly and a mounting bracket provided on the panel portion. The spring strut assembly includes a strut member 24 telescopically movable within a cylindrical casing 25 and arranged to exert a tensile force generally normal to the trailing region of panel portion 21 by means of a compression spring (not shown) provided within the casing. The other end of the strut assembly 22 is pivotally attached to a structural part of the slat, for example a spar thereof. The strut assembly therefore provides a force which tends flexibly to move the panel portion 21 from its unfolded cruise position when the slat is stowed to its folded, high lift, position when the slat is extended.

The movement of panel portion 21 between these positions is controlled by means of a bell crank lever 26 pivotally mounted on the slat cam track 14 in combination with a cam surface 27 provided within the leading edge region of the fixed wing portion 10.

One end of the bell crank lever 26 is provided with a closed slot 28 which receives the spanwise rod 23 attached to the panel portion 21 for pivotal, and limited sliding, movement. The other end of the bell crank lever 26 carries a cam roller 29 which rides on cam surface 27.

The cam surface 27 is formed with a profile which, as the slat 18 is deployed and the slat cam track 14 extends forwardly with respect to the fixed wing portion, allows bell crank lever to rotate clockwise about its mounting on the cam track 14 (as viewed in FIGS. 2 and 4), and consequently allows the panel portion 21 to be flexed upwardly under the influence of the strut assembly 22 to lie adjacent the leading edge of the concave trailing surface region 20 of the slat so as to define a substantially continuous aerofoil profile to the slat either side of the slat cam track 14.

The slat also includes a spanwise extending seal member 30 pivotally mounted on the slat adjacent the leading edge of the trailing surface region 20 of the slat which serves to seal the gap between the slat and the leading edge region of the fixed wing portion when the slat is stowed. The seal member includes an arm having a spanwise stub 31 which is slidably received in a slot 32 attached to or forming part of the cylindrical casing 25 of the strut assembly 22 and the location of the strut assembly with respect to the slat is such that as the strut assembly is allowed to contract as the slat is extended, it rotates with respect to the slat so as to move the seal member from a protruding position where it seals against the leading edge region of the fixed wing portion 10 when the slat is stowed to a flush position where it is flush with the folded panel portion 21 and the trailing surface region 20 when the slat is extended.

Provision is also made for sealing part of the slot left in the leading edge region of the wing when the slat is extended and deflected downwards. A blanking cover plate 33 with an associated upper seal is attached to a bogey member 34 which runs in a track 35 provided in the leading edge region of the wing and is urged forwardly by means of an extending compression strut assembly 36 pivotted at the end to a fixed structure of the wing and at its other end to the bogey. Adjacent its attachment to the strut assembly 36, the bogey carries a spanwise roller 37.

Movement of the blanking cover plate 33 from a retracted position to an extended position in which it forms a continuous surface with the leading edge region of the wing to cover part of the slot required for extension of the slat is controlled by cam roller 29 on the end of bell crank lever 26. As slat cam track 14 is extended, cam roller 29 moves forward, allowing blanking cover plate 33 to move to its extended position; slightly before the cover plate reaches its extended position spanwise roller contacts cam wedge 38 provided on the slat cam track to allow final extension of the blanking cover plate and, on retraction of the slat, initial retraction thereof. This latter feature ensures that initial opening and final closing of the blanking cover plate is in accordance with the position of the slat cam track thereby avoiding the possibility of the blanking cover plate jamming and damaging bell-crank lever 26.

Figure 3:
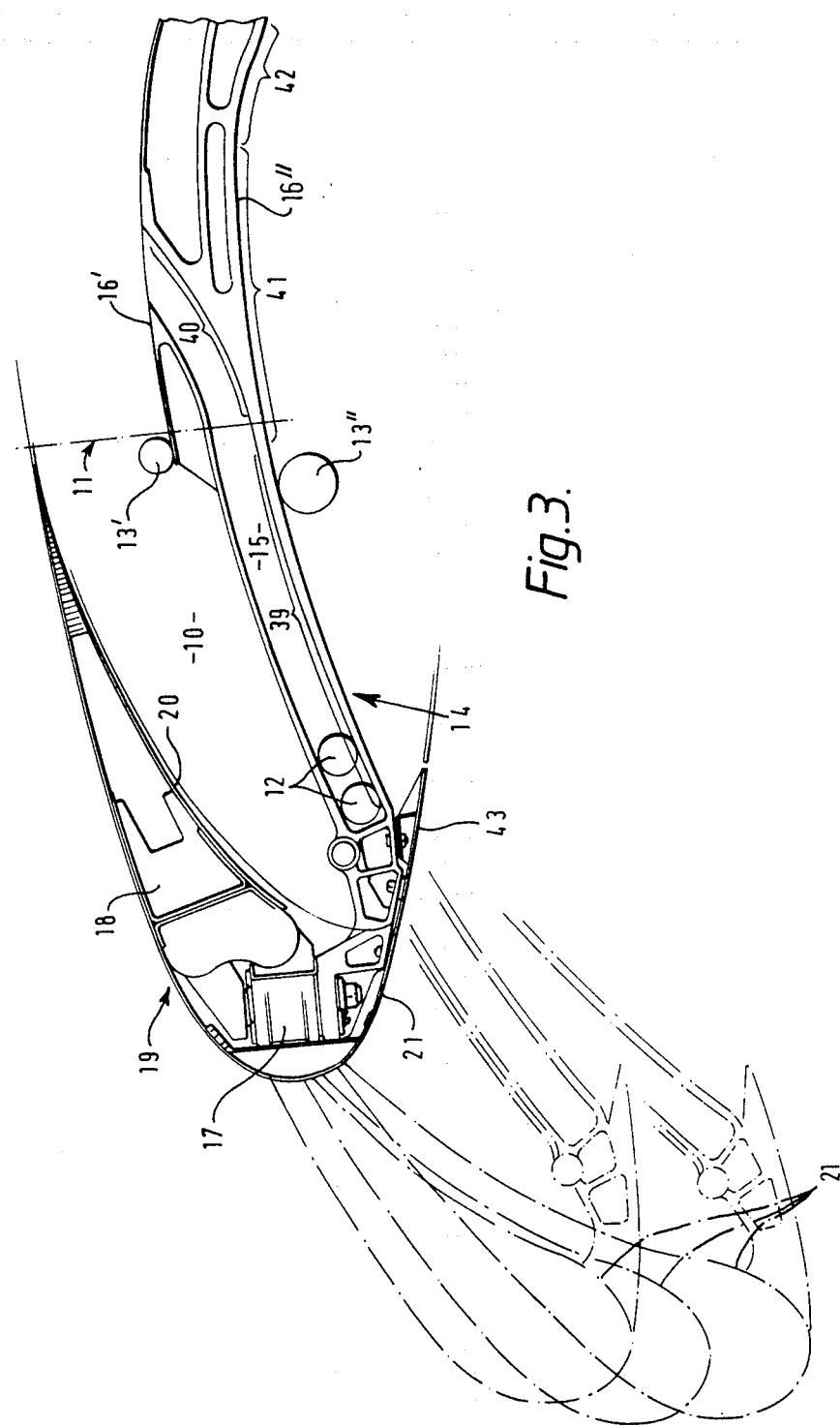
FIG. 3 is a sectional side view of the wing of FIGS. 1 and 2, again with some parts removed for clarity but on a reduced scale, showing the slat in its stowed configuration, and at three extended settings, namely a take-off setting, an intermediate setting and a landing setting.
Figure 5B:
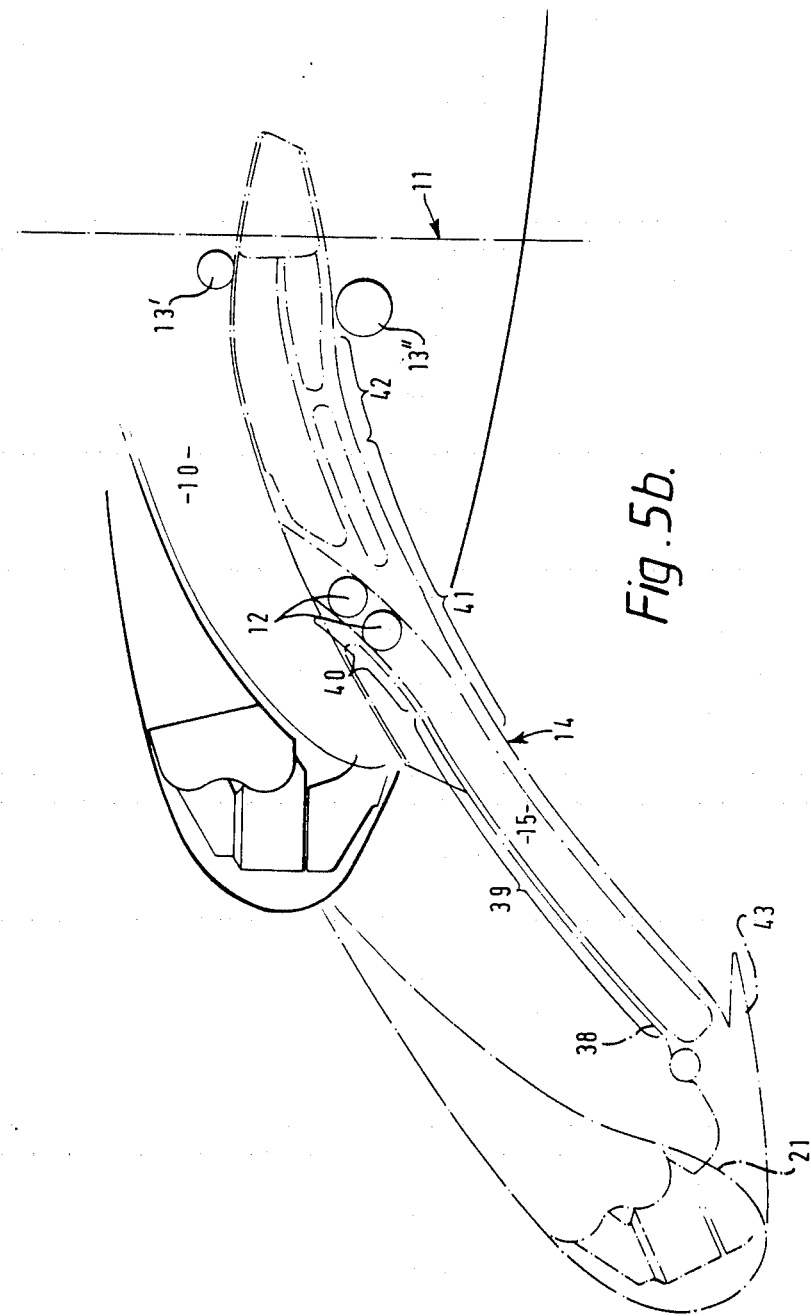

Referring now to FIGS. 3 and 5, the slat cam track is machined from a single piece of material and has a forward portion of generally I-section which provides two side-by-side trackways 15, defined by the flanges of the section (only one trackway being shown in the Figures), in which run roller bearings 12. Roller bearings 12' and 12" are mounted on a bogey which is attached to the wing structure for turning movement about a spanwise axis. Trackway 15 has a forward major portion 39 of relatively slight curvature centred on a given point located well below the wing and a trailing portion 40 of relatively high opposite curvature out of which the roller bearings 12 may be withdrawn. As mentioned above, the forward portion of the slat cam track is also provided with an external cam wedge 38 which co-operates with the blanking cover plate 33.

The slat cam track is also provided with upper and lower matching external cam surfaces 16', 16" respectively on a rearward portion thereof, which co-operate with spanwise rollers 13' and 13". The external cam surfaces are provided with forward major portions 41 of relatively slight curvature centred on said given point and rearward portions of relatively high curvature in the same sense.

On deployment of the slat from a stowed configuration to an extended configuration, it follows a path defined by the compounding of the effect of roller bearings 12 running in trackway 15 and the effect of roller bearings 13' and 13" running on external cam surfaces 16', 16" respectively. The path followed by the slat is initially that of a slight downward curve centred on said given point, the deflection of the slat per unit movement being relatively small. This continues until roller bearings 12 meet trailing portion 40 which occurs roughly at the same time as roller bearings 13 meet trailing portions 42; when this occurs the slat is deflected through a relatively large angle per unit length of extension. It will be noted that since trackway 15 is formed integrally with slat cam track 14 and cam surfaces 16', 16" are formed externally thereof, the foremost part of the cam surfaces may overlap the rearmost part of the trackway, thereby enabling use of a relatively short slat cam track.

In a typical arrangement, actuation of the slat is by means of two conventional geared screw drives at selected spanwise locations, and at least two slat cam tracks are provided for each slat to support and guide the slat. In order to maintain controlled flexing of the panel portions 21, each slat cam track pivotally carries a pair of bell crank levers 26, one to each side thereof and each co-operating with one of a respective pair of contracting tension spring strut assemblies 22. The folding and unfolding flexure movements of the panel portions 21 may be transmitted to spaced locations intermediate the slat cam tracks by means of spanwise torque tubes rotatably mounted within the slat and associated linkages pivotally coupled to trailing regions of the panel portions 21.

The slat is also provided with a rigid narrow chordwise extending blanking plate 43 which is of slightly greater width than the slat cam track which extends rearwardly of the slat trailing surface region 20 and which defines a smooth intermediate surface with the adjacent surfaces of the slat and the wing when the slat is stowed.

Operation of the above form of leading edge device will now be described. In the cruise configuration (FIG. 1) the slat 18 is stowed adjacent the leading edge region of the wing, with the spanwise sealing member sealing the slat to the wing and with panel portion 21 defining a smooth and continuous surface intermediate the lower surfaces of the slat and the wing.

On extension of the slat, it initially follows a slight downward curve, determined by the profiles of trackway 15 and external cam surfaces 16; as the slat cam track moves forwardly, the cam roller 29 on the end of bell crank lever 26 rolls along cam surface 27 and this allows blanking cover plate 33 to move forwardly. During initial extension movement, the cam surface traversed by roller 29 is similar in profile to the movement of the slat cam track itself and hence the bell crank lever does not rotate significantly. As the slat cam track moves further forward, the cam surface 27 slopes more steeply and thus bell crank lever 26 turns clockwise to allow the panel portion to be flexed upwardly under the influence of spring strut assembly 22. As this occurs, the strut itself begins to turn about its pivotal mounting on the slat effectively to retract spanwise seal member 30. This action continues until panel portion is folded sufficiently to define a substantially smooth and continuous trailing surface for the slat. As cam roller 29 leaves cam surface 27, blanking cover plate 33 is allowed to move to its extended (closed) position by virtue of the interaction between spanwise roller 37 of the cover plate and the cam wedge 38 on the slat cam track on continued movement of the slat cam track.

At this position, the slat has a relatively smooth aerofoil profile intermediate the cam track and actuation member attachment points characterised in that there is no sharp cusp-like heel associated with the slat. The slat is shown in this position at far left in FIG. 2.

Continued extension of the slat causes it to continue to follow the slight downward curve until roller bearings 12 and 13 reach the trailing, sharp curvature portions of their respective trackway 15 and cam surface 16; thereafter the slat moves along a path of sharp curvature whereby it is deflected downwards through a relatively large angle for a relatively small extension movement.

The overall path followed by the slat therefore may be loosely termed a "hockey stick" profile, that is a relatively long initial path with little deflection followed by a short final path with major deflection. This is in accordance with the design requirements under consideration which call for a take-off slat setting in which there is little deflection of the slat but high extension thereof to increase wing area and a landing setting in which the camber is increased and in which the extension is not significantly increased.

Stowing of the slat is a reversal of the above steps.

If it is wished to remove a slat, it is extended to its maximum extension, the actuators are disconnected, and the slat manually withdrawn until roller bearings 13 leave trackway 15 and the trailing end of slat cam track is free of roller bearings 16 and then removed fully from the wing.

I claim:

1. A leading edge arrangement for an aircraft wing, which includes
   a fixed wing portion;
   a slat member arranged forwardly of the fixed wing portion;
   an arm member supporting said slat member and being slidably mounted with respect to said fixed wing portion for movement between a retracted position in which the slat member lies adjacent the fixed wing portion and an extended position in which a slot is defined therebetween;
   a resiliently flexible panel portion extending rearwardly from a lower edge region of the slat member, and
   panel profile control means including link means pivotally mounted on said arm member and coupled to said panel portion, cam means provided on said link means co-operable with cam track means provided in the fixed wing portion to control movement of said panel portion on extension and retraction movement of said arm member,
   the arrangement being configured such that when the arm member is in its retracted position the panel portion defines a generally smooth intermediate lower surface bridging the fixed wing portion and the slat member, but when the arm member is in its extended position the panel portion is caused to adopt a folded position in which, together with further surface regions of the slat member it defines a generally smooth forward wall region for said slot.

2. A leading edge arrangement as claimed in claim 1, wherein said arm means includes first and second cam surface means co-operable with first and second cam surface means provided in the fixed wing portion and configures so that from its retracted position the slat member initially moves to a take-off position, along a path in which the ratio of downward deflection of the slat member to its forward extension is relatively low, thereby to increase the effective chord of the wing, and thereafter moves to a landing position along a path in which the ratio of downward deflection of the slat member to its forward deflection is relatively high, thereby to increase the chamber of the wing.

3. A leading edge arrangement as claimed in claim 2, wherein said first cam surface means comprises a trackway formed in a forwad region of said arm means and said second cam surface means comprises an external cam surface provided on a rearward region of said arm means.

4. A leading edge arrangement as claimed in claim 3, wherein each of said first and second cam surface means include forward and rearward portions, the respective forward portions each being of circular arc form centred on a common given point located a substantial distance below the fixed wing portion.

5. A leading edge arrangement as claimed in claim 4, wherein the rearward portion of said first cam surface means is of arcuate form having a relatively high curvature in the sense opposed to that of the forward portion.

6. A leading edge arrangement as claimed in claim 1 wherein the panel portion is formed of a flexible metal material.

7. A leading edge arrangement as claimed in claim 1 wherein the panel portion is formed of a fibre reinforced plastics material.

8. A leading edge arrangement as claimed in claim 1 which further includes spring strut means connecting a region of the panel portion to the slat member.

* * * * *